United States Patent [19]
Wightman

[11] 3,778,594
[45] Dec. 11, 1973

[54] POSITIVE LIQUID TEMPERATURE CONTROLLING DEVICE

[76] Inventor: John W. Wightman, 3 Ridgecreek, St. Louis, Mo. 63141

[22] Filed: Oct. 16, 1972

[21] Appl. No.: 297,799

Related U.S. Application Data

[63] Continuation-in-part of Ser. No. 111,185, Feb. 1, 1971, abandoned.

[52] U.S. Cl. ............... 219/430, 99/447, 219/432, 219/433, 219/435, 219/436, 219/439, 219/442, 219/530, 219/540
[51] Int. Cl. ............................................ F27d 11/02
[58] Field of Search............ 219/386, 387, 429, 430, 219/431, 432, 433, 434, 435, 436, 437, 438, 219/439, 440, 441, 442, 460, 521, 530, 540; 126/369; 99/447

[56] References Cited
UNITED STATES PATENTS

| | | |
|---|---|---|
| 2,469,778 | 5/1949 | Morici ............................ 126/369 |
| 3,488,473 | 1/1970 | Sanders........................... 219/436 X |
| 2,682,602 | 6/1954 | Huck ............................... 219/433 |
| 2,952,764 | 9/1960 | Minami............................ 219/433 X |
| 3,010,006 | 11/1961 | Schwaneke ..................... 219/442 |
| 3,432,641 | 3/1969 | Welke.............................. 219/433 |
| 3,247,360 | 4/1966 | Ponder............................. 219/436 |
| 3,369,105 | 2/1968 | Wheeler........................... 219/441 |
| 3,519,798 | 7/1970 | Waltner........................... 219/439 |
| 3,610,884 | 10/1971 | Evans et al. .................... 219/439 |
| 3,681,568 | 8/1972 | Schaefer.......................... 219/432 |

*Primary Examiner*—Volodymyr Y. Mayewski
*Attorney*—Philip B. Polster et al.

[57] ABSTRACT

A cup and base combination is provided by which liquid contents of the cup can be maintained at a desired potable temperature at every level of the liquid.

4 Claims, 8 Drawing Figures

PATENTED DEC 11 1973 3,778,594

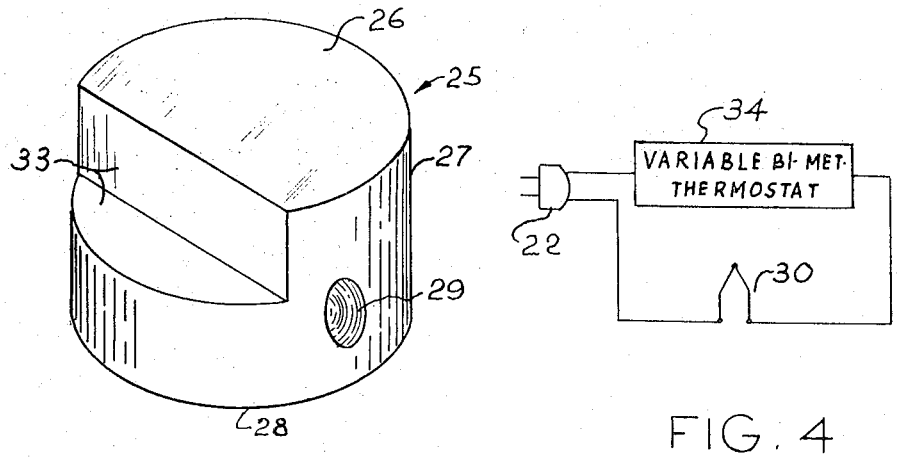
FIG. 3
FIG. 4
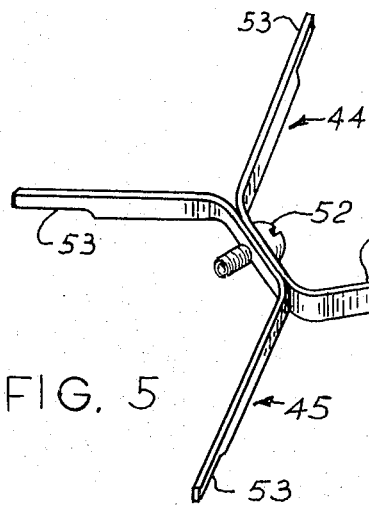
FIG. 5
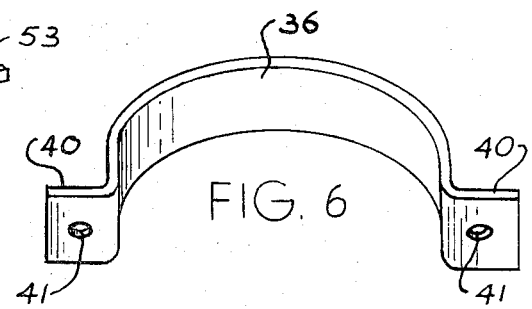
FIG. 6
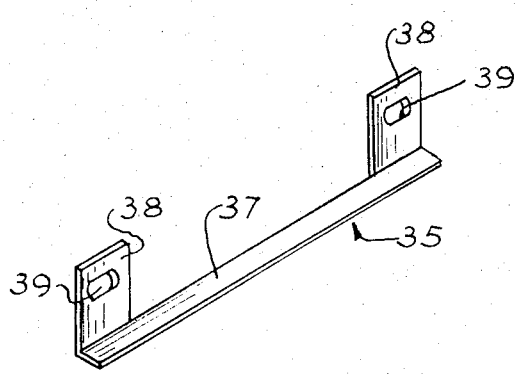
FIG. 7
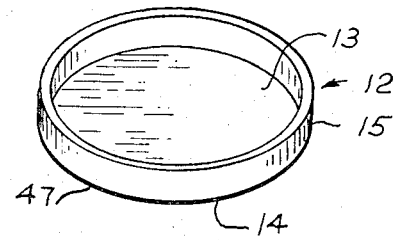
FIG. 8

POSITIVE LIQUID TEMPERATURE CONTROLLING DEVICE

CROSS-REFERENCE TO RELATED APPLICATION

This application is a continuation-in-part of application Ser. No. 111,185, filed Feb. 1, 1971, now abandoned.

BACKGROUND OF THE INVENTION

This invention relates to a cup and base combination and in particular to a novel construction in a beverage cup and heat-supplying base. While the invention is described in detail as applied to a coffee cup, those skilled in the art will recognize the applicability of the apparatus of this invention to other potable liquids.

For those who enjoy a leisurely cup of coffee, or those whose coffee drinking is frequently interrupted, the problem of the coffee's becoming tepid has been a vexing one since time immemorial. Insulated cups are helpful, but if the coffee is too hot to drink to begin with, they prolong the time during which the coffee cools sufficiently to be drunk, and if the coffee is just right to begin with, it cools, insulation or not, during periods of interruption.

Various heating devices have been suggested, from candles to electric heaters, but they have been either complicated, uncontrolled, or hazardous. Examples of patented electric coffee heating devices include U. S. Pats. to Sanders, No. 3,488,473, Johnstone, No. 2,863,037, Preston, No. 1,650,999, Welke, No. 3,432,641, and Schmidt, No. 2,680,190.

One of the objects of this invention is to provide apparatus by which liquid in a drinking cup can be maintained at a desired temperature at any and every level of liquid.

Another object of this invention is to provide such apparatus which is safe in use, easy and safe to clean, and attractive.

Other objects will become apparent to those skilled in the art in light of the following description and accompanying drawings.

SUMMARY OF THE INVENTION

In accordance with this invention, generally stated, a cup is provided having a side wall of non-metallic, generally heat insulative material, and a metallic bottom surface which transmits heat from a stationary heat transfer surface, the temperature of which is selectively controllable, directly to the fluid within the cup. The heat transfer surface, which forms a part of the assembly making up the device, is so constructed that the danger of burning or shocking the user of the apparatus is practically eliminated.

In the preferred embodiment, the cup is provided with a skirt which serves the double function of insulating the inner side wall of the cup from the hand of the user and concealing the metal bottom. Also in the preferred embodiment, the stationary heat transfer surface is aluminum; the side wall of the cup is ceramic and the bottom is a flat-bottomed, rimmed stainless steel dish, embracing and outboard of a part of the inner side wall. In the preferred embodiment, the temperature of the heating element is not only controllable but selectively variable within limits, preferably between about 170° and 195° F. The heating element has sufficient capacity to ensure maintenance of the desired temperature and the control is such as to prevent the generation in the cup of continuingly higher temperatures.

BRIEF DESCRIPTION OF THE DRAWINGS

In the drawings.

FIG. 3 is a view in perspective of a heat block, normally mounted, in inverted position from that shown, within the base of the apparatus illustrated in FIG. 1;

FIG. 4 is a diagrammatic representation of the electrical heating circuit for the apparatus of FIG. 1;

FIGS. 5–7 are views, in perspective, illustrating various mounting parts contained within the base of the apparatus shown in FIG. 1; and FIG. 8 is a view in perspective of the heat disc mounted in the bottom of the cup shown in FIG. 1.

DESCRIPTION OF THE PREFERRED EMBODIMENT

Figure 2:
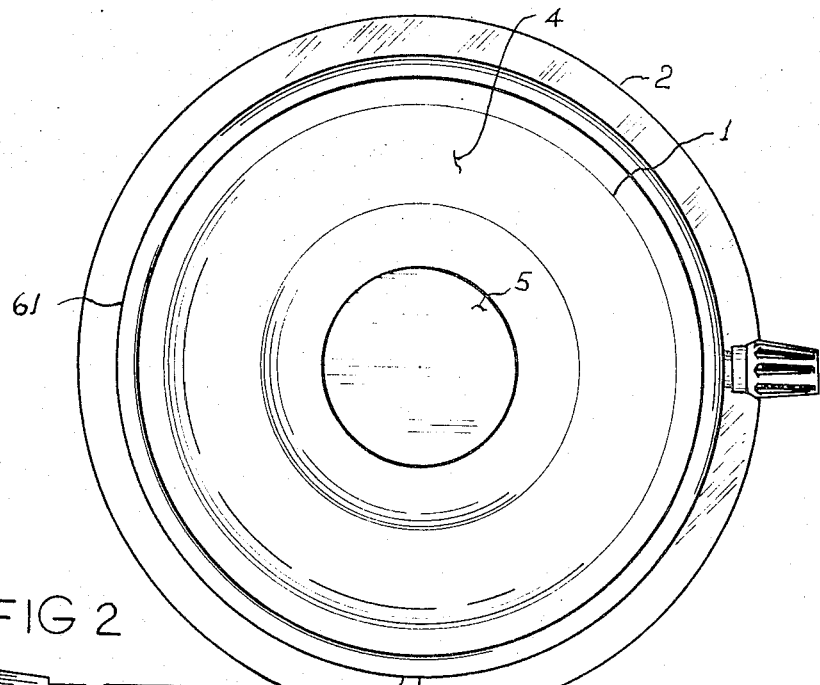
FIG. 2 is a top plan view of the apparatus illustrated in FIG. 1.
Figure 1:
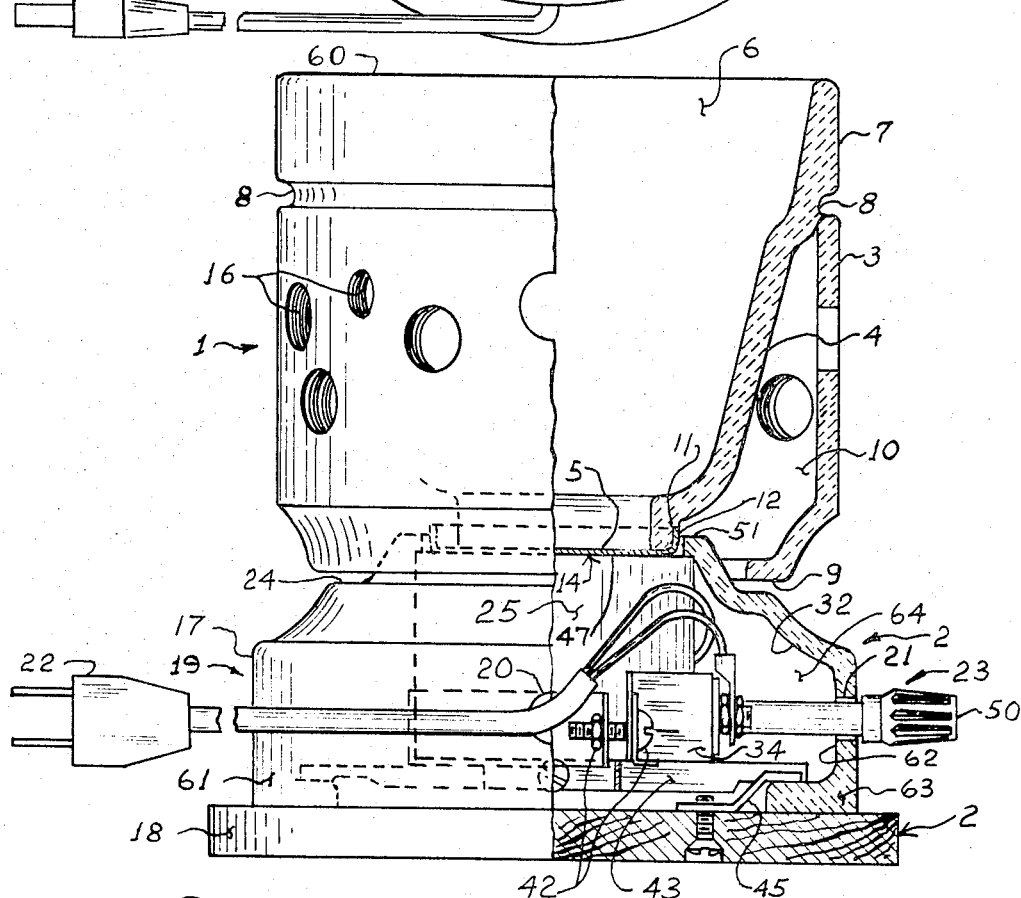
FIG. 1 is a view in side elevation, partly broken away and partly in section, of one illustrative embodiment of a base and container of this invention.

Referring now to FIG. 1, reference numeral 1 indicates a cup removably mounted on a base 2.

Cup 1 has a generally cylindrical shaped body, an open top 60, an exterior side wall or skirt 3, an interior side wall 4 and a bottom 5. Side walls 3 and 4 are joined integrally along a lip section 7, but diverge below a groove 8 which runs about cup 1 circumferentially. Side wall 4 and bottom 5 together delineate a liquid receptacle 6.

Skirt 3 extends vertically downwardly from groove 8, while inner wall 4 slopes convergently downwardly, diverging from skirt 3. Skirt 3 has an inwardly directed annular foot 9. Foot 9 prevents cup 1 from tipping when the cup is in its base mounted position and functions as a support for the cup when the cup is placed on other surfaces. In the embodiment of FIG. 1, skirt 3 has a plurality of openings 16 in it.

The visual impression generated by foot 9 and skirt 3 is that of an open ended cylindrical tube. However, as has been indicated, wall 4 slopes inwardly toward the central axis of cup 1, and meets bottom 5 short of the lower edge of the skirt 3.

The skirt 3 and wall 4 define an air space 10 between them. Air space 10 provides an insulative barrier between heated liquid contained in receptacle 6 and the skirt 3. Openings 16, besides being decorative, allow circulation of air between space 10 and the ambient air. The relatively poor heat transfer characteristic of air means not only that skirt 3 remains cool to the touch, but that the liquid itself retains heat longer as heat loss through the cup wall is decreased. In addition, openings 16 increase the resistance to heat flow in skirt 3 as heat dissipates into skirt 3 from lip section 7. Thus, less power is consumed in maintaining the heated liquid at a preselected temperature.

Bottom 5, in the preferred embodiment, is the flat surface of a heat conductive dish 12. Dish 12 is made up of a flat surface 14 and a rim 15. The rim 15 of dish 12 is sealed to wall 4 along the radially outer circumferential surface of a retaining edge 11 of side wall 4. Various adhesives may be utilized for sealing, provided they are nontoxic in applications intended primarily for human use, and render the seal impervious to heated liquid. Silastic adhesive or epoxy works well. The adhesive may also fill any crevice between the flat surface 14 contiguous the rim 15 and the bottom surface of the edge 11.

Dish 12 is preferably made of stainless steel, but may be constructed from any suitable heat conductive material, such as aluminum. An advantage of stainless steel is that its coefficient of expansion is close to that of the ceramic of which the side wall is made.

Base 2 includes an exterior sheel 17 and a platform 18. The preferred embodiment utilizes a solid wood cylindrical section for platform 18. Other materials or shapes are satisfactory.

Shell 17 has a side wall 19 with an outer surface 61 and an inner surface 62. Shell 17 and platform 18 are intermounted by a plurality of wing fasteners 45 which lock onto a turned edge 63 of side 19. Fasteners 45 are conventional and need be no more than an ordinary screw and wing plate combination. When so intermounted, platform 18 and shell 17 delineate a chamber 64. Side 19 has an opening 20 and an opening 21 in it. Opening 20 allows entry to chamber 64 of a conventional power cord and plug 22. Opening 21 provides egress for a control arm 23 from that chamber. The function of arm 23 is explained in detail hereinafter. In the preferred embodiment, arm 23 has a knob 50 attached to it. Knob 50 conventionally is constructed from plastic and is slid onto arm 23 in a friction fit.

Side wall 19 is waved step fashion near a top edge 51. One wave trough forms a support ledge 24. A heat block 25 is used as a top wall for shell 17 and is attached to side wall 19 by any convenient method. Silastic or epoxy adhesives work well. The preferred construction of heat block 25 is described hereinafter. It is important, where interchangeable cups and bases are desired, to position block 25 and support 24 diametrically and vertically so that foot 9 of skirt 3 just clears support 24 while heat block 25 and heat conductive dish 12 are in heat transfer relationship.

Block 25 is illustrated in FIG. 3. As there shown, block 25 generally is cylindrical, having a bottom 26, a side 27 and a top 28. Side 27 has a tapped opening 29 in it. Opening 29 receives a heater element 30 in a press fit. Heater element 30 may be any conventional electrical energy dissipater, preferably operable from a 110 volt A.C. line, and is diagrammatically represented in FIG. 4. In the preferred embodiment, adhesive is applied along an edge of top 28 and block 25 is inserted in shell 17 until the block abuts edge 51. However, other common mounting methods may be utilized and the particular design of edge 51 and top 28 may be varied accordingly.

Block 25 is cut away along a chord of the circle defined by bottom 26 to form a step 33. Step 33 provides a niche within chamber 24 for mounting a bimetallic temperature controller unit 34. Controller 34, diagrammatically represented in FIG. 4, may be any one of the several commercially available controller units. As shown in FIG. 4, a simple series circuit is used with only two active components, heater 30, and contoller 34. Control arm 23 is mechanically coupled to controller 34 and is used to manually pre-select a desired setting, and thus control current flow and heat dissipation in heater 30. The ability to maintain a desired liquid temperature is one of the advantages of my invention. However, a variable resistor may be used in the electrical circuit in place of controller 34, although the aforesaid advantageous automatic temperature control is lost. In any event, it is contemplated that the temperature of the top 28 will not exceed 200° F.

Controller 34 mounting is accomplished through the use of a bracket 35 and a collar 36. Controller 34 commonly has a rectangular enclosure and step 33 is sized to abut that enclosure along two sides. Bracket 35 has a support platform 37 and a pair of legs 38. Each of legs 38 has a bolt hole 39 in it. Collar 36 has a pair of tabs 40 with a bolt hole 41 in each tab. Collar 36 is sized to engage heat block 25 circumferentially and to mate with bracket 35 at their respective bolt holes. Platform 37 is used to support a third side of the enclosure of resistor 34. Tightening a pair of conventional screw-bolts 42 between collar 36 and bracket 35 wedges resistor 34 against step 33. Consequently, the entire mechanism contained within chamber 64 is fixed to block 25. This combination, in turn, is supported within the chamber by a spider 43.

Spider 43 is formed by joining two single U-shaped parts 44 and 45 by a bolt 52, the preferred construction being illustrated in FIG. 5. Each tip 53 of spider 43 may be partially cut away to facilitate insertion of the spider within cavity 64. Tips 53 rest on an internally turned flange 63 of side wall 19.

Simple operation is provided. Cup 1 is filled with liquid and placed on base 2. Controller 34 is set at the desired position. Heater 30 dissipates energy into heat block 25, through heat conductive dish 12, and into the liquid. It is desirable that the heater be of sufficient capacity to ensure that the liquid in the cup is brought back to the desired temperature rapidly, and so controlled as to ensure that the temperature does not exceed a predetermined limit.

Merely by way of illustration, and not by way of limitation, it has been found that a 50 watt heater with a control which limits the temperature of the exposed surface of the block to a temperature below 200° F. and preferably to the range of 170°–195° F., will bring 8 ounces of lukewarm coffee (110°–120° F.) to a commonly acceptable temperature in the range of 135°–155° F. as desired in a few minutes and maintain the desired temperature indefinitely. If no control were provided, the coffee would get hotter and hotter until it boiled. If a 20 watt heater is used, the time required to restore the desired temperature from a cooler temperature is too great and in a cool ambient temperature the heating capacity of such a heater is likely to be too low even to maintain the desired temperature. In any case, the heater is closed, with a solid surface exposed and all resistance elements inaccessible to accidental touching.

The provision of a rimmed dish-shaped heat transfer bottom element is particularly advantageous. It provides a mode of sealing which makes cleaning easy, which permits accomodation of variation in the dimensions of the stepped retaining edge of the cup, and which puts the heating surface in heat-transfer relation to the liquid and very little to the ambient air at every level of liquid in the cup.

Numerous variations, within the scope of the appended claims, will occur to those skilled in the art in light of the foregoing description and accompanying drawings. Thus, cup 1 and base 2 may be varied aesthetically. For example, openings 16 may be eliminated or their placement varied. Different materials may be utilized for portions of the apparatus. I prefer a ceramic cup 1 and shell 17, but other heat insulative materials are satisfactory. Varying mounting methods between block 25 and shell 17 may be used. For example, a heat resistive rubber gasket and a press fit between the block and shell works well when a groove or step is formed or milled in block 25 near top 28. Likewise, the design of spider 43 may be changed. Thus spider 43 may be designed to exert pressure against block 25 as an aid in mounting the block. The spider may even be eliminated. Other silicone type mounting materials besides silastic may also be used. These variations are merely illustrative.

Having thus described the invention, what is claimed and desired to be secured by Letters Patent is:

1. A device adapted to maintain hot potable liquid at desired temperature for indefinite periods comprising:

an insulating base having an exterior shell and a bottom electric heating element contained in said base and having a power cord for connection to an electric source of energy;

heat conductive cover means in immediate heat transfer relation to said electric heating element means, said heat conductive cover means being exposed through an area of and forming a part of the upper portion of said base; and a cup removably mounted on said base and comprising a side wall of ceramic material and a heat transfer bottom element of metal of substantially greater heat conductivity than the side wall, said side wall having an opening-defining retaining edge at its bottom and said bottom element being in the form of a shallow dish with a rim, said rim embracing and being adhered in liquid-tight engagement to said retaining edge, and said bottom element extending into heat transfer relationship with said base heat conductive element cover means.

2. The device of claim 1 wherein the bottom element is made of stainless steel.

3. The device of claim 1 wherein the cup is provided with a skirt spaced through a part of its height from the bottom edge thereof from the said side wall.

4. The device of claim 1 including control means electrically connected to the electric heating element for controlling said electric heating element to permit the cover means to attain a maximum temperature less than 200° F.

* * * * *